(12) United States Patent
Lee

(10) Patent No.: US 11,300,820 B2
(45) Date of Patent: Apr. 12, 2022

(54) DISPLAY DEVICE

(71) Applicant: AU Optronics Corporation, Hsin-Chu (TW)

(72) Inventor: Yin-Ting Lee, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 0 days.

(21) Appl. No.: 17/130,733

(22) Filed: Dec. 22, 2020

(65) Prior Publication Data

US 2021/0109397 A1 Apr. 15, 2021

Related U.S. Application Data

(63) Continuation of application No. 16/577,356, filed on Sep. 20, 2019, now abandoned.

(30) Foreign Application Priority Data

Dec. 21, 2018 (TW) .................................. 107146549

(51) Int. Cl.
*G02F 1/1333* (2006.01)
*G02F 1/13357* (2006.01)
*G06F 3/041* (2006.01)

(52) U.S. Cl.
CPC .. *G02F 1/133308* (2013.01); *G02F 1/133602* (2013.01); *G06F 3/0412* (2013.01); *G02F 1/133317* (2021.01); *G02F 1/133608* (2013.01)

(58) Field of Classification Search
CPC ......... G02F 1/133308; G02F 1/133608; G02F 1/133317; G02F 1/133328;
(Continued)

(56) References Cited

U.S. PATENT DOCUMENTS 7,253,865 B2 * 8/2007 Battersby ............ G02F 1/13336
257/293
8,109,667 B2 2/2012 Wang et al.
(Continued)

FOREIGN PATENT DOCUMENTS

CN 101761830 A 6/2010
CN 207764521 U 8/2018
(Continued)

*Primary Examiner* — Jong-Suk (James) Lee
*Assistant Examiner* — James M Endo
(74) *Attorney, Agent, or Firm* — WPAT, PC

(57) ABSTRACT

A display device includes a frame, a display module, and a plastic structure. The frame includes a bottom plate and a sidewall surrounding the bottom plate. The bottom plate has a concave surface. The display module is disposed above the frame and has a curved bottom surface. The sidewall of the frame is located at an outer edge of the display module. The concave surface of the bottom plate faces toward the curved bottom surface of the display module. The plastic structure is disposed at the sidewall of the frame and has a supporting surface facing away from the sidewall of the frame. The supporting surface is disposed between the sidewall of the frame and the display module. The plastic structure extends between and conformal to the curved bottom surface of the display module and the concave surface of the bottom plate of the frame.

12 Claims, 8 Drawing Sheets

(58) Field of Classification Search
CPC ......... G02F 1/133603; G02F 1/133605; G02F 1/133314; G02F 1/13332
See application file for complete search history.

(56) References Cited

U.S. PATENT DOCUMENTS

| | | | | |
|---|---|---|---|---|
| 10,436,972 | B2* | 10/2019 | Yasunaga | G02B 6/0088 |
| 10,534,126 | B2* | 1/2020 | Watanabe | G02B 6/0038 |
| 2009/0010025 | A1 | 1/2009 | Okita | |
| 2009/0091681 | A1* | 4/2009 | Nishizawa | G02F 1/133308 |
| | | | | 349/58 |
| 2009/0115933 | A1* | 5/2009 | Mimura | G02F 1/133606 |
| | | | | 349/59 |
| 2010/0013853 | A1* | 1/2010 | Takatori | G02F 1/134336 |
| | | | | 345/611 |
| 2012/0050645 | A1* | 3/2012 | Okada | G02F 1/133608 |
| | | | | 349/64 |
| 2012/0169944 | A1 | 7/2012 | Kuromizu | |
| 2013/0188114 | A1 | 7/2013 | Sugaya | |
| 2014/0204281 | A1* | 7/2014 | Maeda | G02F 1/133611 |
| | | | | 348/794 |
| 2015/0016090 | A1 | 1/2015 | Lee et al. | |
| 2015/0219324 | A1 | 8/2015 | Kim | |
| 2015/0309366 | A1 | 10/2015 | Park et al. | |
| 2016/0014880 | A1* | 1/2016 | Lee | H05K 5/02 |
| | | | | 361/752 |
| 2016/0026027 | A1* | 1/2016 | Kim | G02F 1/133608 |
| | | | | 349/58 |
| 2016/0054614 | A1* | 2/2016 | Choi | G02F 1/133608 |
| | | | | 349/58 |
| 2016/0161085 | A1 | 6/2016 | Kwon et al. | |
| 2017/0023828 | A1 | 1/2017 | Lee | |
| 2017/0090113 | A1* | 3/2017 | Yuki | G02B 6/0088 |
| 2017/0123274 | A1* | 5/2017 | Jeong | G02F 1/133606 |
| 2017/0293067 | A1 | 10/2017 | Watanabe et al. | |

FOREIGN PATENT DOCUMENTS

| | | |
|---|---|---|
| TW | I456313 B | 10/2014 |
| TW | M565340 U | 8/2018 |

* cited by examiner

DISPLAY DEVICE

CROSS-REFERENCE TO RELATED APPLICATION

This application is a continuation application of U.S. patent application Ser. No. 16/577,356, filed Sep. 20, 2019, which claims priority to Taiwan Application Serial Number 107146549, filed Dec. 21, 2018, all of which are herein incorporated by reference in their entirety.

BACKGROUND

Field of Invention

The present disclosure relates to a display device.

Description of Related Art

Due to the prevalence of touch-operated interfaces, touch-sensitive displays that combine touch technologies with displays have been widely used. A typical touch display system includes a backlight module, a display panel, a front frame, and a touch panel which are sequentially disposed. Generally, the touch display is fixed by fitting a plurality of frames to each other.

SUMMARY

The disclosure provides a display device. The display device includes a frame, a display module, and a plastic structure. The frame includes a bottom plate and a sidewall surrounding the bottom plate. The bottom plate has a concave surface. The sidewall includes a straight portion and a curved portion adjacent to the straight portion. The display module is disposed above the frame and has a curved bottom surface. The sidewall of the frame is located at an outer edge of the display module. The concave surface of the bottom plate faces toward the curved bottom surface of the display module. The plastic structure is partially disposed at the curved portion of the sidewall of the frame and has a supporting surface facing away from the sidewall of the frame. The straight portion of the sidewall of the frame is free of the plastic structure. The supporting surface is disposed between the sidewall of the frame and the display module. The plastic structure extends between and conformal to the curved bottom surface of the display module and the concave surface of the bottom plate of the frame.

In some embodiments of the present disclosure, the plastic structure includes a first supporting portion that is located between the sidewall of the frame and the display module and has a top surface. The top surface of the first supporting portion serves as the supporting surface, and is a concave surface and bonded to the curved bottom surface of the display module.

In some embodiments of the present disclosure, the first supporting portion straddles the sidewall of the frame.

In some embodiments of the present disclosure, a top surface of the sidewall has a first area. The top surface of the first supporting portion has a second area. The second area is larger than the first area.

In some embodiments of the present disclosure, the plastic structure further includes a second supporting portion that is located on the sidewall of the frame and has a side surface facing away from the sidewall. The side surface of the second supporting portion serves as the supporting surface and is a convex surface.

In some embodiments of the present disclosure, the display device further includes a reflective layer bonded to the side surface of the second supporting portion.

In some embodiments of the present disclosure, a thickness of the second supporting portion is gradually increasing away from the display module.

In some embodiments of the present disclosure, the display device further includes a fixing member fixing the plastic structure to the frame through the second supporting portion.

In some embodiments of the present disclosure, the plastic structure is formed from a non-conductive material.

In some embodiments of the present disclosure, the frame is spaced apart from the display module.

It is to be understood that both the foregoing general description and the following detailed description are by examples, and are intended to provide further explanation of the disclosure as claimed.

BRIEF DESCRIPTION OF THE DRAWINGS

The disclosure may be more fully understood by reading the following detailed description of the embodiment, with reference made to the accompanying drawings as follows.

DETAILED DESCRIPTION

Figure 1A:
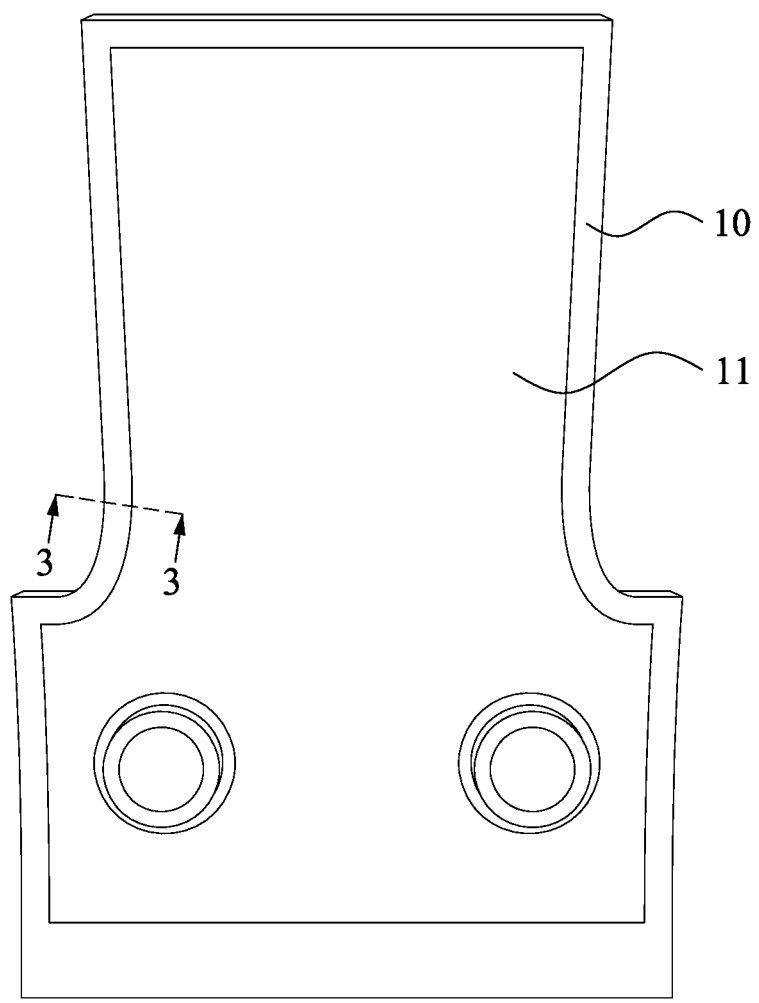
FIGS. 1A and 1B are a top view and a perspective view of a display device in accordance with some embodiments of the present disclosure, respectively.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Figure 1B:
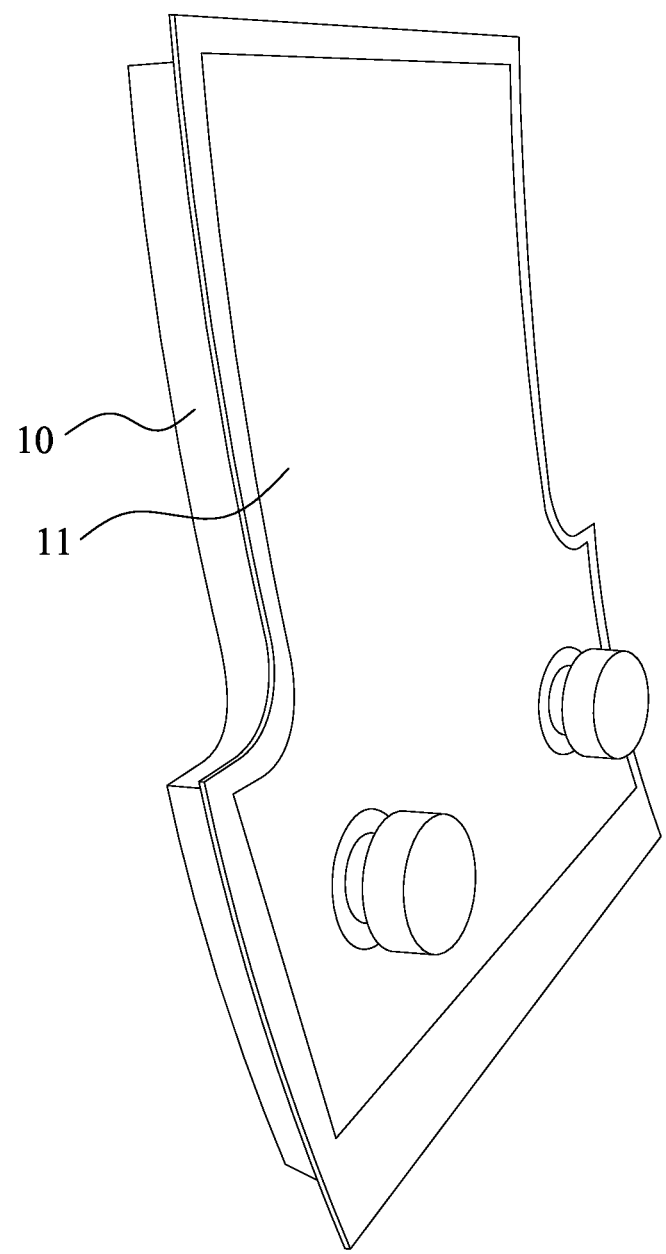
Figure 2:
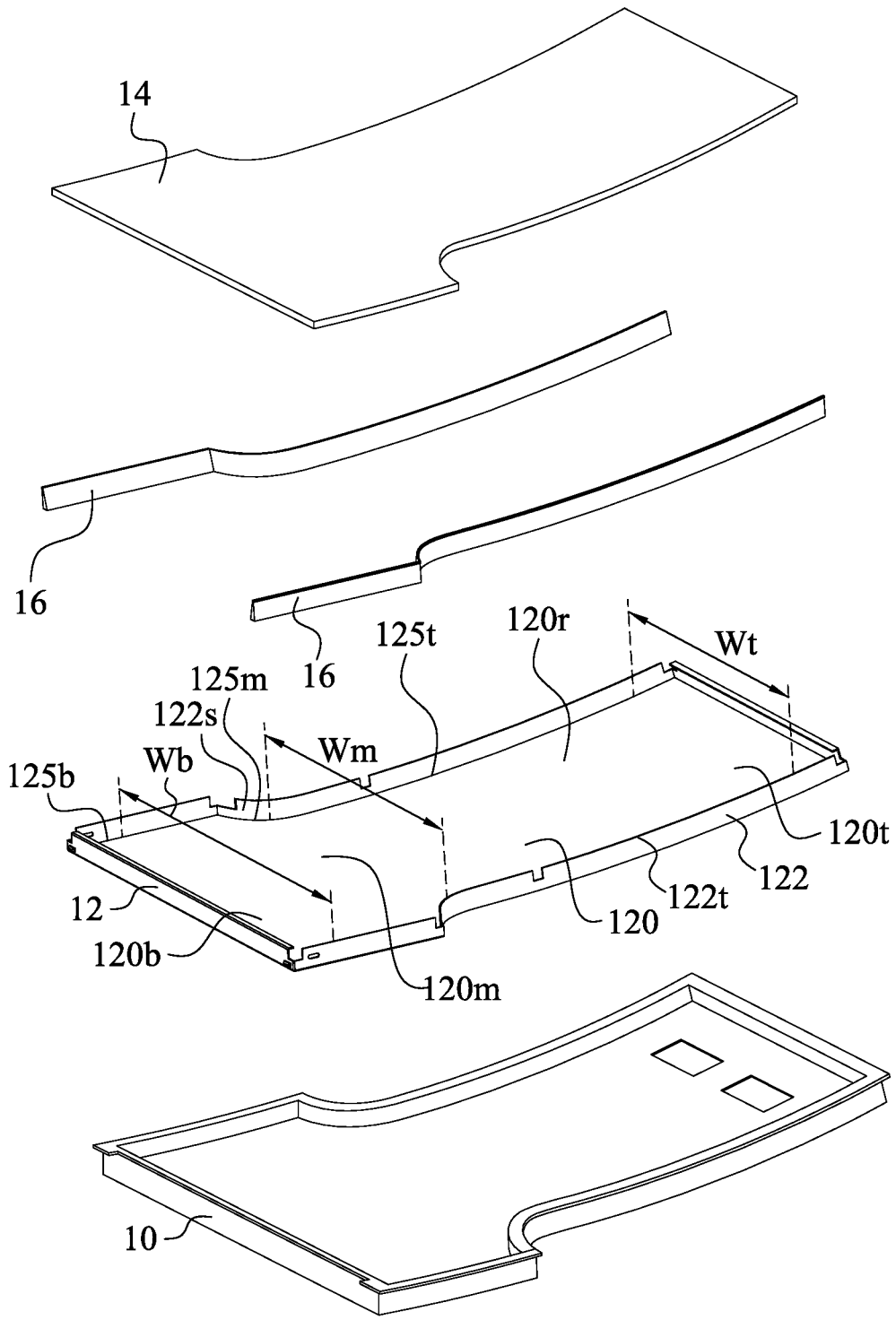
FIG. 2 is an explosive view of a display device in accordance with some embodiments of the present disclosure.
Figure 3:
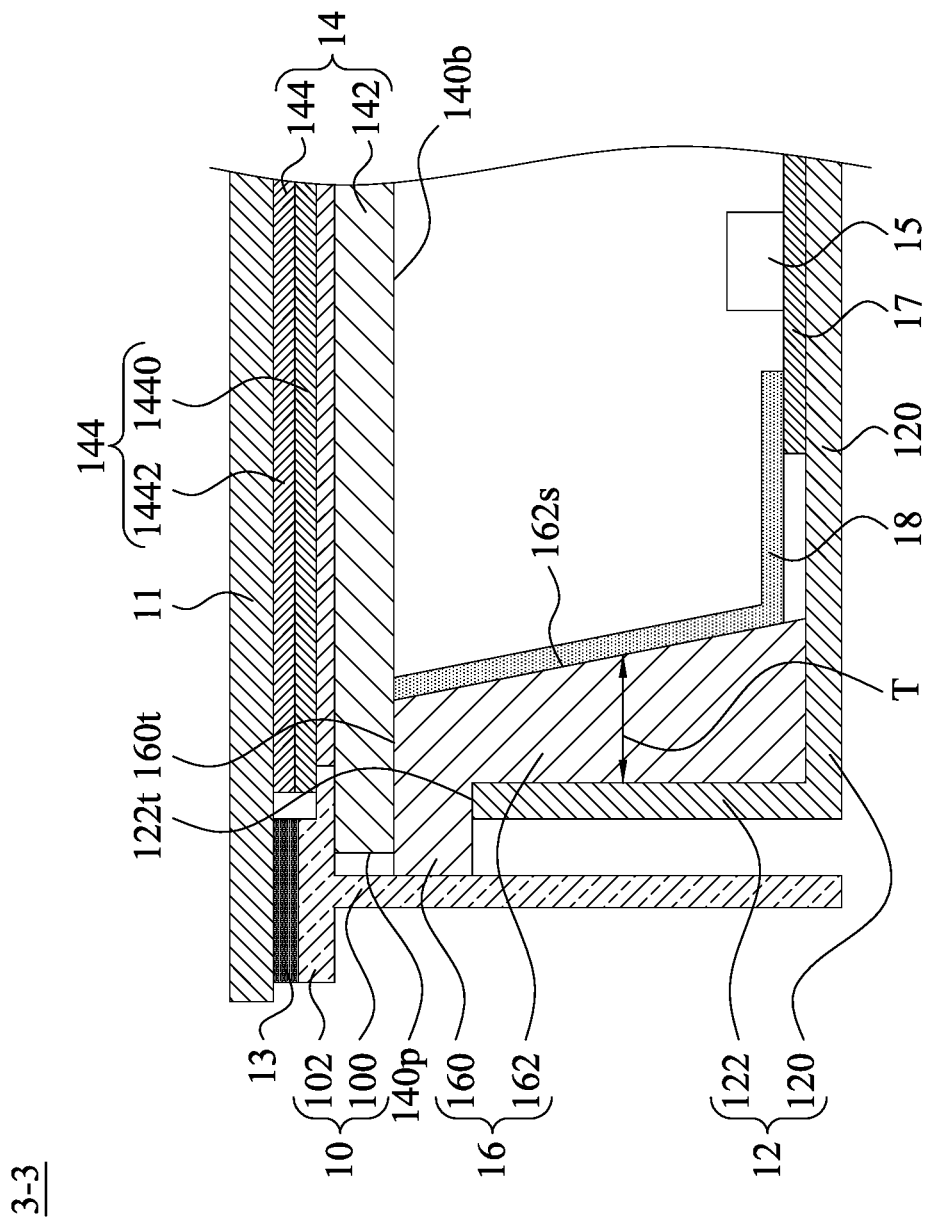
FIG. 3 is a cross-sectional view viewed along line 3-3 in FIG. 1A.

Reference is made to FIGS. 1A, 1B, 2, and 3. FIGS. 1A and 1B are a top view and a perspective view of a display device 1 in accordance with some embodiments of the present disclosure, respectively. FIG. 2 is an explosive view of a display device 1 in accordance with some embodiments of the present disclosure. FIG. 3 is a cross-sectional view viewed along line 3-3 in FIG. 1A. As shown in FIG. 2, in some embodiments, the display device 1 includes a housing 10, a frame 12, a display module 14, and a plastic structure 16. As shown in FIG. 3, in some embodiments, the display device 1 further includes a substrate 11, a connecting structure 13, circuit board 17, a reflective layer 18, and a light source 15. The structures and functions of the elements and the relationship therebetween are described in detail hereinafter.

In FIG. 2, the frame 12 includes a bottom plate 120 and a sidewall 122 surrounding the bottom plate 120. In some embodiments, the frame 12 is a symmetric structure, but the present disclosure is not limited thereto. The bottom plate 120 of the frame 12 has a concave surface 120r facing toward the display module 14, and has A has a smooth concave edge 125m. Further, the bottom plate 120 of the frame 12 may be divided into a bottom portion 120b, a middle portion 120m, and a top portion 120t. A width Wb of the bottom portion of 120b of the bottom plate 120 is greater than a width Wt of the top portion of 120t of the bottom plate 120. A width Wm of the middle portion 120m is gradually changed. For example, the width Wd of the middle portion 120m from the bottom portion 120b to the top portion 120t is gradually reduced from the width Wb to the width Wt, thereby forming the concave edge 125m.

In FIG. 2, surfaces of the bottom portion 120b, the middle portion 120m, and the top portion 120t of the bottom plate 120 facing toward the display module 14 form a concave surface 120r. The bottom portion 120b and the top portion 120t have bottom edge 125b and top edge 125t connected to the concave edge 125m, respectively. That is, the concave edge 125m of the middle portion 120m is connected between the bottom edge 125b of the bottom portion 120b and the top edge 125t of the top portion 120t. The bottom edge 125b, the concave edge 125m, and the top edge 125t are curved away from the display module 14.

In FIG. 2, the sidewall 122 of the frame 12 is substantially perpendicular to the bottom plate 120 and is connected to the bottom edge 125b of the bottom portion 120b, the concave edge 125m of the middle portion 120m, and the top edge 125t of the top portion 120t. Further, the sidewall 122 of the frame 12 has a top surface 122t facing away from the bottom plate 120 and has a side surface 122s connected to the concave surface 120r of the bottom plate 120. In some embodiments, the side surface 122s of the sidewall 122 is curved substantially along with the concave edge 125m of the middle portion 120m to form a convex surface.

In some embodiments, a thickness of the sidewall 122 of the frame 12 is substantially the same from one end adjacent to the bottom plate 120 to another end away from the bottom plate 120, but the present disclosure is not limited thereto. In some embodiments, the thickness of the sidewall 122 of the frame 12 is substantially the same along the bottom edge 125b of the bottom portion 120b, the concave edge 125m of the middle portion 120m, and the top edge 125t of the top portion 120t. In some embodiment, the frame 12 is formed from material including metal. Since the sidewall 122 of the frame 12 is a curved structure, and a supporting structure is not easily formed on the sidewall 122 of the frame 12 to support the display module 14, the plastic structure 16 as shown in FIGS. 2 and 3 is used to support the display module 14 of the display device 1.

In FIG. 3, the display module 14 is disposed above the frame 12 and has a bottom surface 140b. The frame 12 is spaced apart from the display module 14 by the plastic structure 16. Specifically, the plastic structure 16 includes a first supporting portion 160 and a second supporting portion 162. The first supporting portion 160 of the plastic structure 16 is disposed above the sidewall 122 of the frame 12 and between the sidewall 12 of the frame 12 and an optical film 142 of the display module 14.

The first supporting portion 160 has a top surface 160t facing away from sidewall 122. In some embodiments, the top surface 160t of the first supporting portion 160 is curved substantially along with the bottom edge 125b of the bottom portion 120b, the concave edge 125m of the middle portion 120m, and the top edge 125t of the top portion 120t shown in FIG. 2, so as to form a concave surface away from the display module 14. The top surface 160t of the first supporting portion 160 is in contact with and is conformal to the bottom surface 140b of the display module.

In FIG. 3, the first supporting portion 160 of the plastic structure 16 straddles the sidewall 12 of the frame 12. Specifically, the top surface 122t of the sidewall 122 of the frame 1 has a first area A1. The top surface 160t of the first supporting portion 160 of the plastic structure 16 has a second area A2. The second area A2 of the plastic structure 16 is greater than the first area A1 of the frame 12. Therefore, the first supporting portion 160 of the plastic structure 16 may provide a larger area than the sidewall 122 to support the display module 14, thereby improving the stability of the display module 14 in the display device 1.

In FIG. 3, the second supporting portion 162 of the plastic structure 16 is connected to an end of the first supporting portion 160 located away from the housing 10, and is disposed on the sidewall 122 of the frame 12 and between the sidewall 122 of the frame 12 and the display module 14. Specifically, a thickness of the second supporting portion 162 is gradually increasing away from the display module 14. The second supporting portion 162 has a side surface 162s away from the sidewall 122. The side surface 162s of the second supporting portion is inclined and faces toward the display module 14. In some embodiments, the side surface 162s of the second supporting portion 162 is curved substantially along with the concave edge 125m shown in FIG. 2 to form a convex surface. The side surface 162s of the second supporting portion 162 is attached to the reflective layer 18 and an end of the second supporting portion 162 is in contact with the bottom 140b of the display module 14. In some embodiments, the side surface 162s of the second supporting portion 162 may also be referred to as a supporting surface for supporting the reflective layer 18.

In some embodiments, the plastic structure 16 is formed from non-conductive material. For example, the plastic structure 16 is formed from material including high-density polyethylene (PE), polyvinyl chloride (PVC), polypropylene (PP), polystyrene (PS), or any other suitable material.

In FIG. 3, the housing 10 has a first portion 100 and a second portion 102. In some embodiments, the first portion 100 is substantially perpendicular to the second portion 102, but the present disclosure is not limited thereto. The housing 10 and the frame 12 may be engaged with each other (see FIGS. 5A and 5B), so as to accommodate components such as the display module 14, the light source 15, and the circuit board 17. Specifically, the first portion 100 of the housing 10 may correspond to the sidewall 122 of the frame 12, and the second portion 102 of the housing 10 may extend toward the display module 14 via the top surface 122t of the side wall 122.

In FIG. 3, the display module 14 includes the optical film 142 and a display panel 144. The optical film 142 of the display module 14 is disposed on the first supporting portion 160 of the plastic structure 16 and is located between first supporting portion 160 of the plastic structure 16 and the second portion 102 of the housing 10. In some embodiments, the second portion 102 of the housing 10 extends partially between the optical film 142 and the display panel 144 of the display module 14. In some embodiments, the optical film 142 may be a diffusion film, a brightness enhancement film, a composite film, or combination thereof.

In FIG. 3, the display panel 144 of the display module 14 is disposed above the second portion 102 of the housing 10. In some embodiments, the display panel 144 includes a first substrate 1440 and a second substrate 1442 covering the first substrate 1440. In some embodiments, the display panel 144 may be a liquid crystal display (LCD) panel, but the present disclosure is not limited thereto. For example, since the liquid crystal display panel cannot emit light by itself, the backlight module (for example, a structure composed of the optical film 142 or the light source 15 and the like) may provide a light source to the display panel 144. In some embodiments, the first substrate 1440 of the display panel 144 may have a lower polarizer (not shown) and the second substrate 1442 may have an upper polarizer (not shown). In addition, if the display panel 144 is a self-illuminating display panel (for example, an organic electroluminescent display panel, a reflective display panel, an electrophoretic display panel, etc.), the display panel 144 may omit the backlight module.

In FIG. 3, the substrate 11 is located above the display module 14 and is connected an outer surface of the second portion 102 of the housing 10. The substrate 11 may be connected to the second portion 102 of the housing 10 through such as the connecting structure 13. For example, the connecting structure 13 may be a double-sided tape, a glue frame, or another suitable adhesive material. In some embodiments, the substrate 11 may be a cover substrate, a touch substrate, a three-dimensional imaging substrate, or another suitable component.

In FIG. 3, the circuit board 17 is disposed on the bottom plate 120 of the frame 12. The light source 15 is disposed on the circuit 17 and is configured to provide light toward the optical film 142, but the present disclosure is not limited thereto. In other embodiments, the light source 15 also can be placed at a desired position according to design requirements. The light of the light source 15 is guided by the optical film 142 to provide a surface light source to the display panel 144.

In FIG. 3, the reflective layer 18 is deflected from the side surface 162s of the second supporting portion 162 and extends to the circuit board 17, and is spaced apart from the frame 12 by the plastic structure 16. The reflective layer 18 is configured to reflect the light emitted by the light source 15 to the display module 14, thereby improving the luminous efficiency of the display module 14.

Figure 4A:
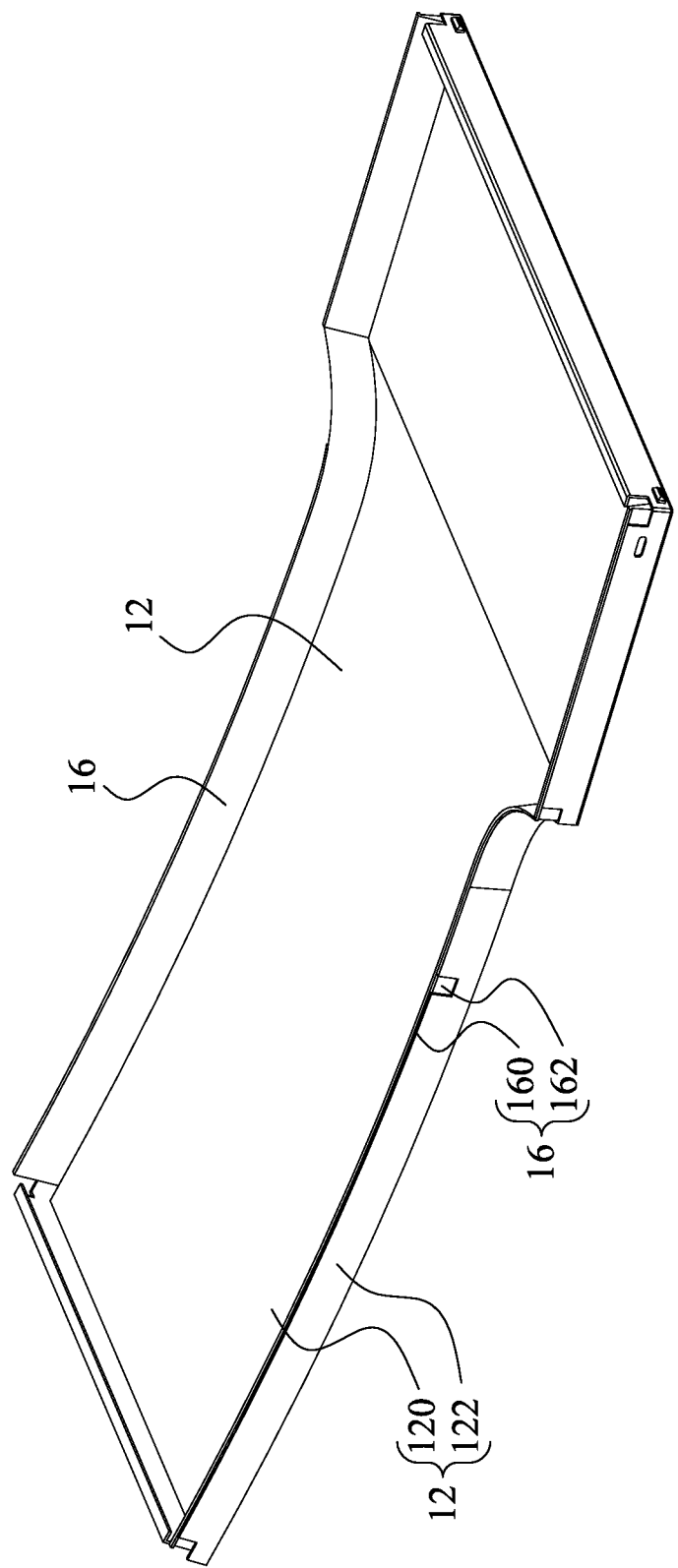
FIG. 4A is a perspective view of a frame and a plastic structure of a display device in an intermediate assembly stage in accordance with some embodiments of the present disclosure.
Figure 4B:
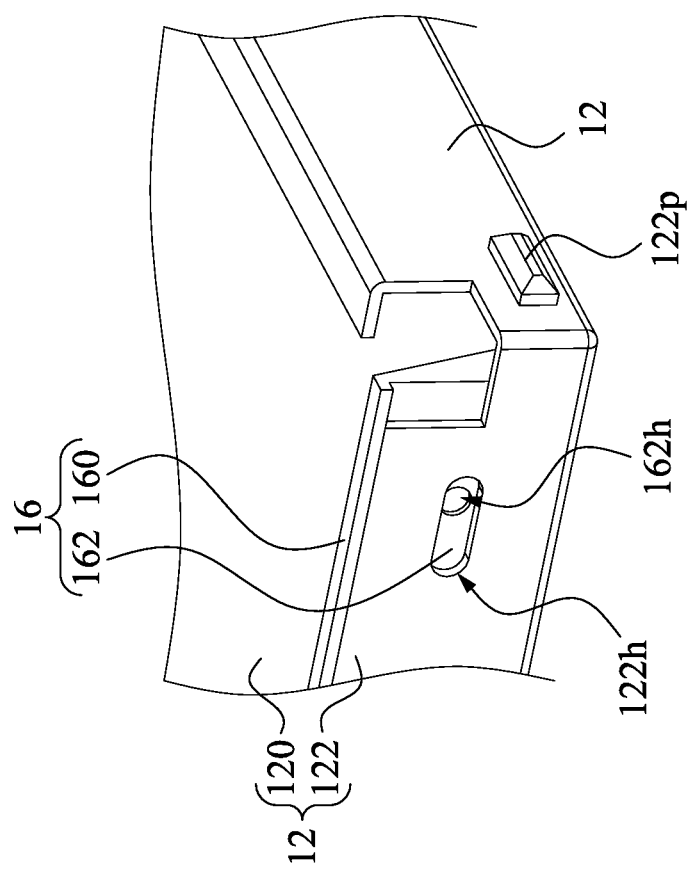
FIG. 4B is an enlarged view of a partial structure shown in FIG. 4A.
Figure 5A:
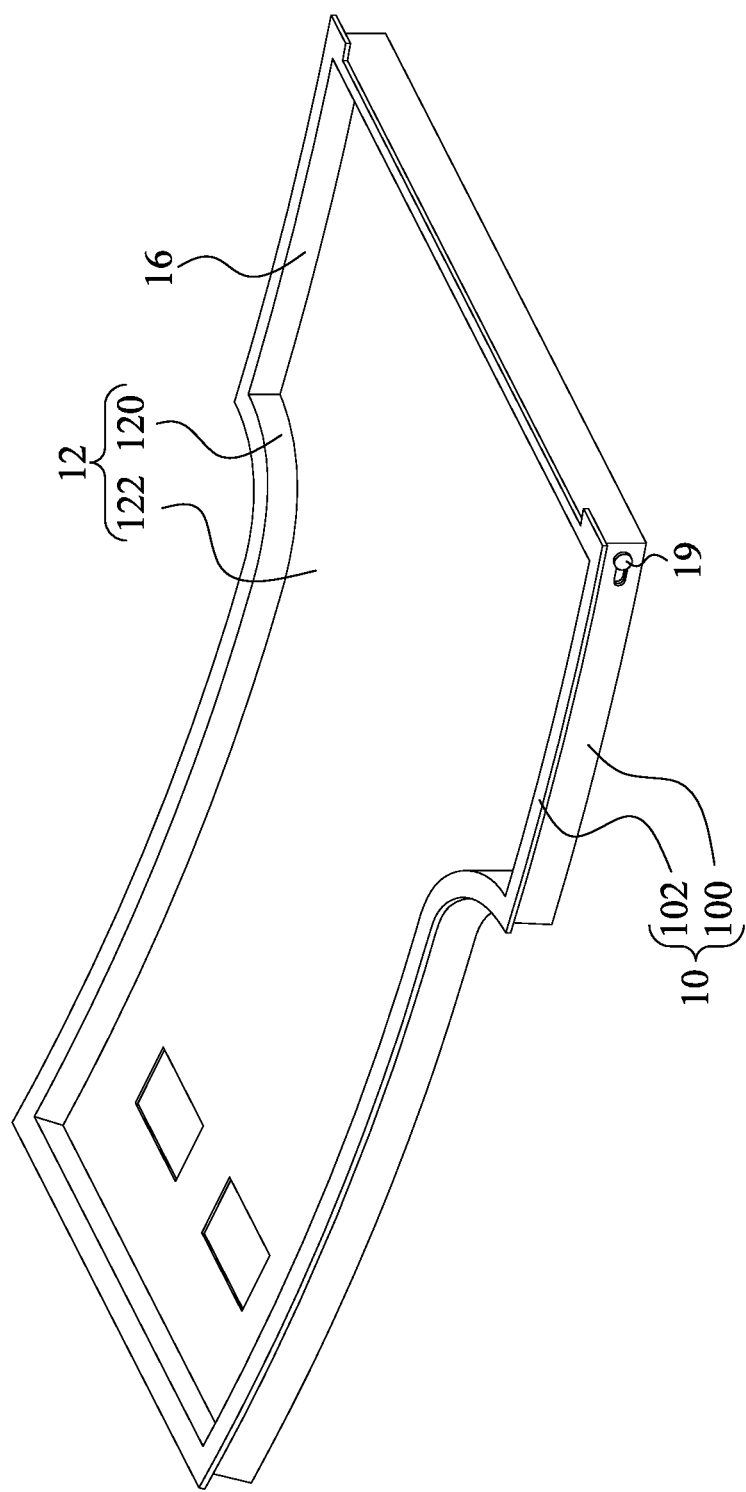
FIG. 5A is a perspective view of a frame, a plastic structure, and a housing of a display device in an intermediate assembly stage in accordance with some embodiments of the present disclosure.
Figure 5B:
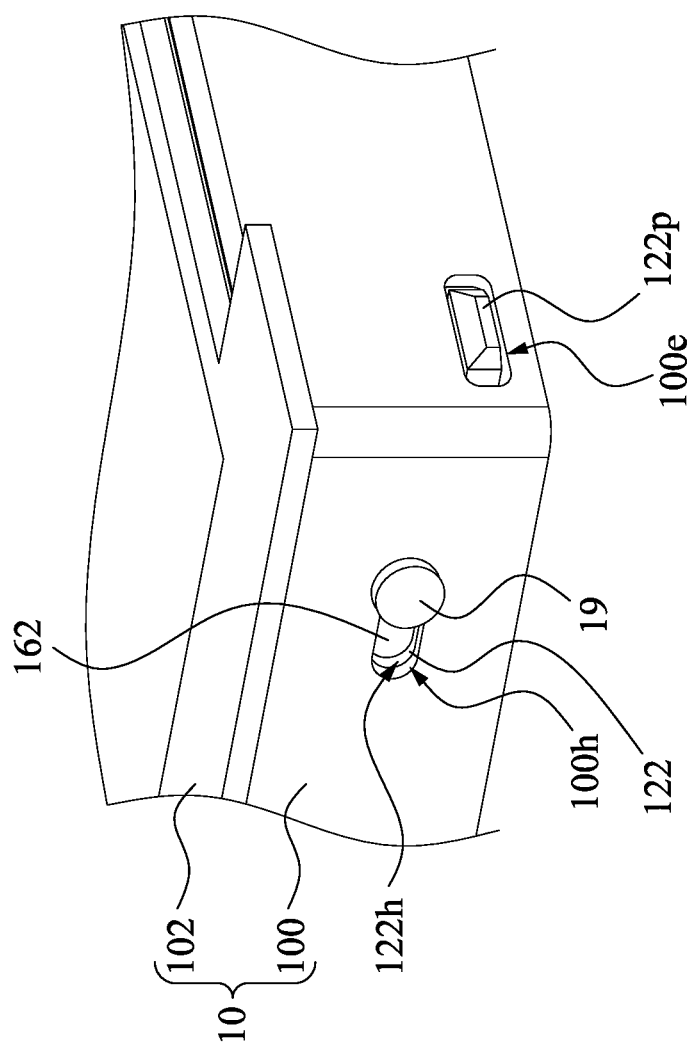
FIG. 5B is an enlarged view of a partial structure shown in FIG. 5A.

Reference is made to FIGS. 4A, 4B, 5A, and 5B. FIG. 4A is a perspective view of the frame 12 and the plastic structure 16 of the display device 1 in an intermediate assembly stage in accordance with some embodiments of the present disclosure. FIG. 4B is an enlarged view of a partial structure shown in FIG. 4A. FIG. 5A is a perspective view of the frame 12, the plastic structure 16, and the housing 10 of the display device 1 in an intermediate assembly stage in accordance with some embodiments of the present disclosure. FIG. 5B is an enlarged view of a partial structure shown in FIG. 5A, in which the display module 14, the substrate 11, the connecting structure 13, the circuit board 17, the reflective layer 18, and the light source 15 as shown in FIGS. 2 and 3 are omitted for clearly illustration.

It is noted that, those of ordinary skill in the art will appreciate that additional components may be assembled prior to, during, and after the assembly process of FIGS. 4A-5B. Some of the assembly processes described below may also be replaced or removed, and the sequence of steps of these assembly processes is interchangeable.

In FIGS. 4A and 4B, the sidewall 122 of the frame 12 has a first assembly hole 122h. The second supporting portion 162 of the plastic structure 16 has a second assembly hole 162h. When the plastic structure 16 is assembled with the frame 12, the second assembly hole 162h of the second supporting portion 162 is substantially aligned with the first assembly hole 122h of the frame 12. Furthermore, the sidewall 122 of the frame 12 further includes an assembly protrusion 122p. The assembly protrusion 122p of the frame 12 protrudes from the sidewall 122 in a direction away from the inside of the frame 12.

In FIGS. 5A and 5B, the display device 1 further includes a fixing member 19. The first portion 100 of the housing 10 has a third assembly hole 100h and a fourth assembly hole 100e. When the frame 12 is assembled with the plastic structure 16 to the housing 10, the second assembly hole 162h of the second supporting portion 162 (see FIG. 4B) and the first assembly hole 122h of the frame 12 are substantially aligned with the third assembly hole 100h of the housing 10. Then, the fixing member 19 passes through the first, second, and third assembly holes 122h, 162h, and 100h, and the plastic structure 16, the frame 12, and the housing 10 are fixed to each other to complete the assembly of the frame 12, the plastic structure 16, and the housing 10.

In addition, when the frame 12 along with the plastic structure 16 are assembled with the housing 10, the assembly protrusion 122p of the frame 12 may extend into the fourth assembly hole 100e of the housing 10 to further engage the frame 12 with the housing 10, thereby further Improving the stability of the overall structure of the display device 1.

According to the foregoing embodiments of the disclosure, it may be seen that, since the sidewall of the frame of the present disclosure is a curved structure corresponding to the curved display module, a supporting structure is not easily formed on the sidewall of the frame to support the display module. Therefore, the present disclosure supports a display module of a display device by using a plastic structure which can be used to support a reflective layer. Further, the top surface of the side wall of the frame has a first area. The top surface of the plastic structure has a second area. The second area of the plastic structure is greater than the first area of the frame. Therefore, the first supporting portion of the plastic structure may provide a larger area than the sidewall to support the display module, thereby improving the stability of the display module in the display device.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A display device, comprising:
    a frame comprising a bottom plate and a sidewall surrounding the bottom plate, wherein the bottom plate has a concave surface, and the sidewall comprises a straight portion and a curved portion adjacent to the straight portion;
    a display module located above the frame and having a curved bottom surface, wherein the sidewall of the frame is located at an outer edge of the display module, and the concave surface of the bottom plate faces toward the curved bottom surface of the display module; and
    a plastic structure partially disposed at the curved portion of the sidewall of the frame comprising a second supporting portion located on the sidewall of the frame, and having a supporting surface facing away from the sidewall of the frame, wherein the straight portion of the sidewall of the frame is free of the plastic structure, the supporting surface is located between the sidewall of the frame and the display module, and is curved and in contact with the curved bottom surface of the display module, and the plastic structure extends between and conformal to the curved bottom surface of the display module and the concave surface of the bottom plate of the frame, the second supporting portion of the plastic structure is curved substantially along a concave edge of the sidewall of the frame to form a convex surface on opposite sides of the frame in a longitudinal direction of the display device, and the sidewall of the frame is curved to correspond to the outer edge of the display module.

2. The display device of claim 1, wherein the plastic structure comprises a first supporting portion that is located between the sidewall of the frame and the display module and has a top surface, wherein the top surface of the first supporting portion serves as the supporting surface, and is a concave surface and bonded to the curved bottom surface of the display module.

3. The display device of claim 2, wherein the first supporting portion straddles the sidewall of the frame.

4. The display device of claim 2, wherein a top surface of the sidewall has a first area, and the top surface of the first supporting portion has a second area that is larger than the first area.

5. The display device of claim 1, wherein the second supporting portion has a side surface facing away from the sidewall, and the side surface of the second supporting portion is a convex surface.

6. The display device of claim 5, further comprising a reflective layer bonded to the side surface of the second supporting portion.

7. The display device of claim 5, wherein a thickness of the second supporting portion is gradually increasing away from the display module.

8. The display device of claim 5, further comprising a fixing member fixing the plastic structure to the frame through the second supporting portion.

9. The display device of claim 1, wherein the plastic structure is formed from a non-conductive material.

10. The display device of claim 1, wherein the frame is spaced apart from the display module.

11. The display device of claim 1, wherein the frame has a first portion and a second portion, a width of the first portion is greater than a width of the second portion in a transverse direction of the display device perpendicular to the longitudinal direction.

12. The display device of claim 11, wherein the width of the first portion of the frame is gradually reduced to the width of the second portion of the frame to form a concave edge of the sidewall of the frame in the longitudinal direction.

* * * * *